United States Patent
Contreras et al.

(10) Patent No.: US 8,310,902 B1
(45) Date of Patent: Nov. 13, 2012

(54) SIGNAL-EXTRACTION LASER-PULSE SYSTEM ARCHITECTURE FOR THERMALLY-ASSISTED MAGNETIC RECORDING

(75) Inventors: John Thomas Contreras, Palo Alto, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/337,046

(22) Filed: Dec. 23, 2011

(51) Int. Cl.
*G11B 11/00* (2006.01)
(52) U.S. Cl. .......................... 369/13.33; 360/59; 360/66
(58) Field of Classification Search ............... 369/13.33, 369/13.26, 13.13, 13.11, 13.12, 13.2, 13.17, 369/116, 53.26; 360/59, 66, 67, 68, 46, 77.03
See application file for complete search history.

(56) References Cited

U.S. PATENT DOCUMENTS

| | | | |
|---|---|---|---|
| 6,744,582 B2 * | 6/2004 | Shimoda et al. | 360/59 |
| 7,660,064 B2 | 2/2010 | Howley et al. | |
| 7,667,914 B2 * | 2/2010 | Contreras et al. | 360/66 |
| 7,995,425 B2 | 8/2011 | Schreck et al. | |
| 2002/0008930 A1 | 1/2002 | Shimoda et al. | |
| 2007/0242384 A1 | 10/2007 | Contreras et al. | |
| 2011/0228652 A1 | 9/2011 | Gage et al. | |
| 2011/0292773 A1 | 12/2011 | Schreck et al. | |

* cited by examiner

*Primary Examiner* — Ali Neyzari
(74) *Attorney, Agent, or Firm* — G. Marlin Knight

(57) ABSTRACT

A thermal-assisted magnetic recording (TAMR) system is described which generates laser-pulse signals from the write data line. Additionally, training signals for initial synchronization are fed to the preamp IC using the write data line during servo read cycle. This requires no increase in the number of wires going to read-write driver chip (R/W IC) (preamp). In embodiments of the invention the R/W IC also includes registers that are set using serial data from the system electronics to influence the characteristics of the drive signal to the laser.

16 Claims, 5 Drawing Sheets

SIGNAL-EXTRACTION LASER-PULSE SYSTEM ARCHITECTURE FOR THERMALLY-ASSISTED MAGNETIC RECORDING

FIELD OF THE INVENTION

The present invention relates generally to magnetic disk drive technology, and more particularly to magnetic disk drives using thermally-assisted magnetic recording (TAMR) that use heating of a spot of thin film magnetic material to achieve higher areal densities.

BACKGROUND

The need to increase magnetic recording densities while maintaining acceptable stability is an on-going challenge for magnetic disk drive designers. Thin film magnetic recording mediums with relatively high magnetic anisotropy and high coercivity provide greater thermal stability, but these parameters are constrained by the strength of the magnetic field that can be generated by the thin film write head to reverse the magnetic orientation of the domains.

One method that allows the more stable magnetic materials to be written is thermally-assisted magnetic recording (TAMR). In TAMR, the magnetic material in the target area is briefly heated to lower both coercivity and anisotropy to allow a lower magnetic field to write the domain. Instantaneous heating aids in writing narrow data tracks on the media. One way to generate the required heat is by integrating a laser diode into the slider along with the read and write heads. Prior systems use DC biasing for the laser signal. There is a need for designs that efficiently use laser-pulses instead of DC biasing to improve the TAMR performance with respect to thermal gradient of the near field transducer and for laser stability. This allows better thermal management of the write head, better synchronization between write data and laser heating cycle as well as prevention of mode hopping in laser diode.

SUMMARY OF THE INVENTION

The embodiments of the present invention provide laser-pulse signals for thermally-assisted magnetic recording (TAMR) systems without increasing the number of wires going to the read-write driver chip (R/W IC) (preamp). The laser pulse (clock) timing is extracted from the write data signal that is input to the driver chip. Further, when the servo information is being read as the slider passes over the servo sectors, the write head is inactive and the write data lines are not being used for write data. The invention takes advantage of this period to place an additional synchronization signals on the write data line that is used to perform initial locking of the clock. During write cycle, write data itself is used to maintain a lock between laser pulse clock and the incoming write data.

The invention does not add any additional lines in the flex cable between the R/W IC and the main integrated circuit for the drive, which is typically a system-on-a-chip (SOC). In embodiments of the invention the R/W IC also includes registers that are set using serial data from the SOC to provide parameters to influence the DC bias, pulse width and phase of the drive signal to the laser diode.

DETAILED DESCRIPTION OF THE INVENTION

Figure 1:
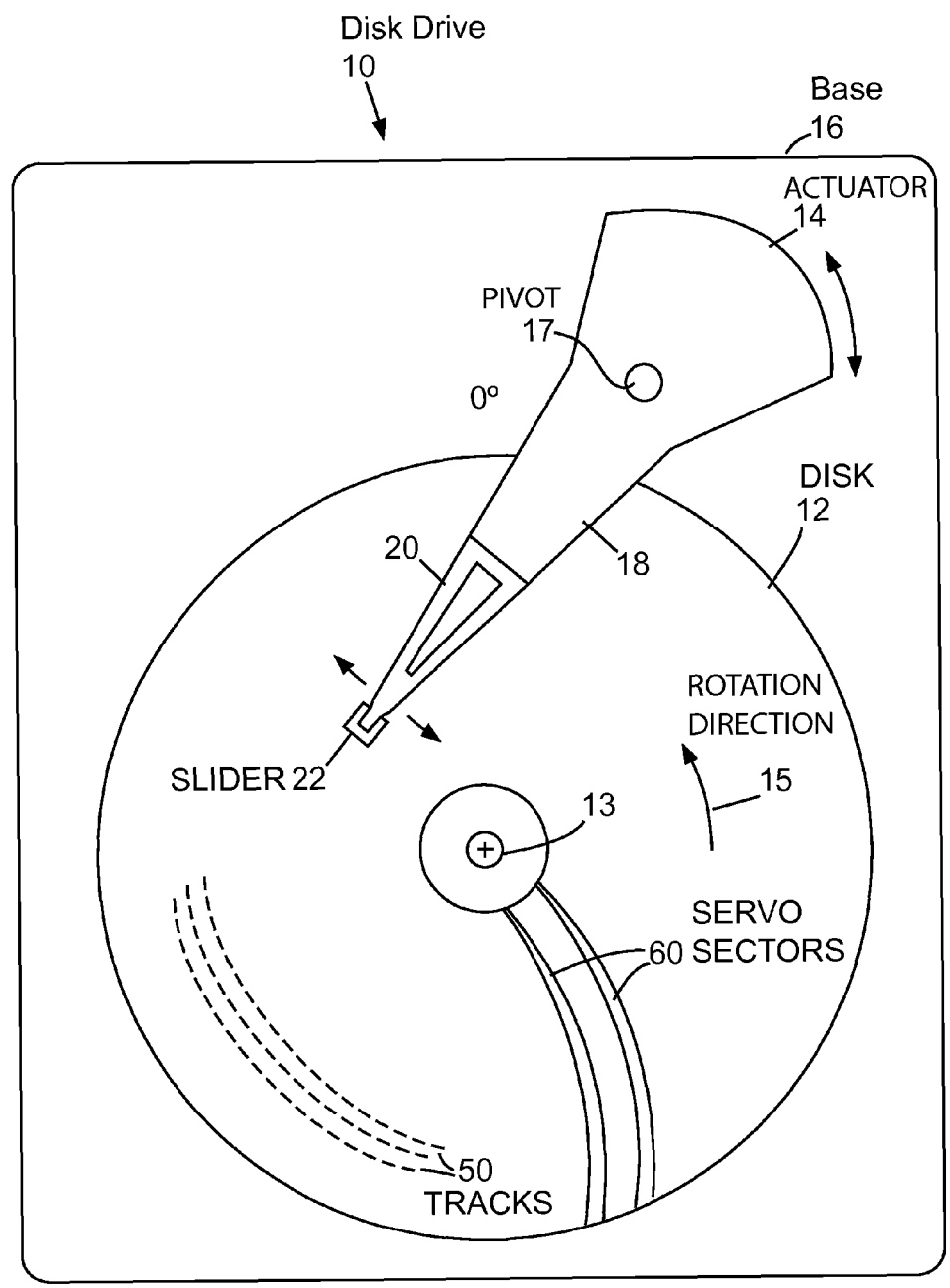
FIG. 1 is an illustration of a top view of selected components of a disk drive according to the prior art.

FIG. 1 is an illustration of selected components of a disk drive 10 according to the prior art in which the invention can be used. The disk drive includes a magnetic recording disk 12 that rotates on axis of rotation 13 in direction 15 driven by a spindle motor (not shown). Housing or base 16 provides support for the components. The upper portion of the outer protective case, which is present for normal operation, is removed for this illustration. This disk drive example includes one or more magnetic recording disks 12 with thin films which have been patterned with data islands (shown in FIG. 2) that include magnetic material, which is separated by nonmagnetic regions. The invention can be also used with disks with continuous magnetic films. The data islands are arranged in concentric, circular data tracks, such as typical tracks 50, only a small portion of which are shown. In practice there are thousands of tracks that extend 360 degrees around the disk. The disk drive includes actuator 14 is pivoted on axis 17 by a rotary voice coil motor (VCM (not shown). The actuator 14 includes a rigid actuator arm 18. A flexible wiring cable (not shown) connects the devices on the actuator including the read/write integrated circuit chip (R/W IC) (not shown) to the drive's electronics. The R/W IC is typically mounted on the actuator arm or can be integrated into the flexible wiring cable, which is usually called the "flex cable." A flexible suspension 20 includes a flexure element (not shown) and is attached to the end of arm 18. Air-bearing slider 22 contains the read/write heads (not shown) and the laser heating structures (not shown). The slider is attached to a flexure. Read/write heads (not shown) and laser heating structures are located on the trailing surface of slider 22. The flexure and suspension 20 enable the slider to "fly" over the disk surface on an air-bearing generated by the rotating disk 12.

As the disk 12 rotates in the direction 15, the read head is positioned over a track to detect (read) the magnetic transitions that have been written in data islands in the track. The read head also detects the angularly spaced servo sectors 60 in the data tracks. Only two of the many servo sectors 60 are shown for simplicity. The servo sectors control the timing of the write clock so that the write head generates magnetic write pulses precisely timed with the passage of the data islands under the write head. Fields in the servo sectors are further illustrated in FIG. 6, which will be discussed below.

Figure 2:
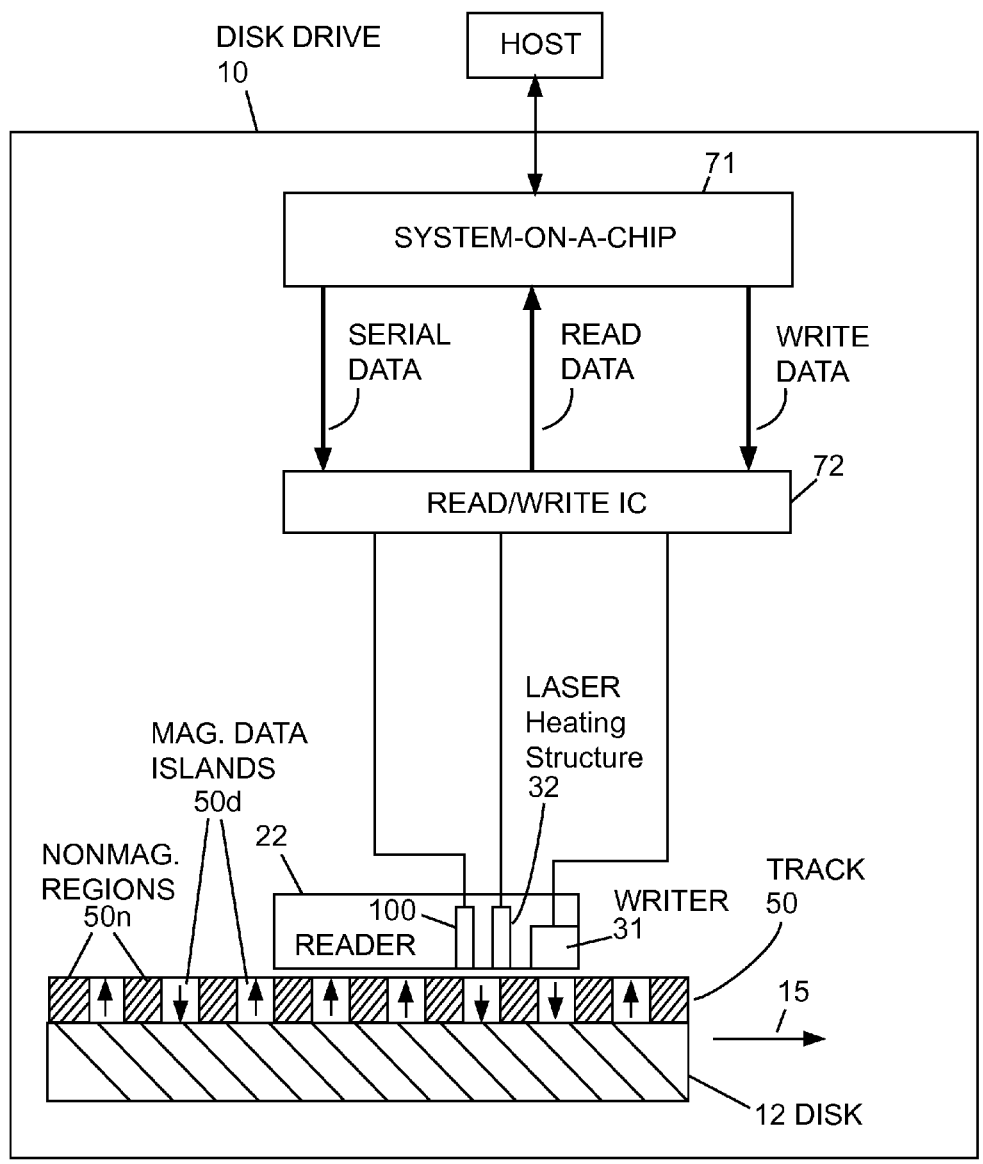
FIG. 2 illustrates a sectional view of the magnetic recording disk with a patterned magnetic recording layer and shows the read and write heads and the laser heating structure connected to the R/W IC according to an embodiment of the invention.

FIG. 2 illustrates selected components in disk drive 10 according to the invention and shows a small sectional view of the magnetic recording disk 12 and air-bearing slider 22. The track 50 is patterned with magnetic data islands 50d separated by nonmagnetic regions 50n. The air-bearing slider 22 is depicted in sectional view flying above disk 12 and is shown with the read head (reader) 100 and the write head (writer) 31. The disk 12 is moving from left to right as shown in the figure. The arrows depicted in the magnetic data islands 50d represent the magnetization directions in the islands, which in this embodiment are shown for perpendicular magnetic recording, but the invention can also be used with thin films with horizontal magnetic orientations. The laser heating structure 32 is according to the prior art and can include a laser diode and various other elements such as power level sensor, a waveguide and a plasmon generator. The laser heating structure 32 heats the magnetic material in the data islands on the rotating disk before they reach the write head. The write head generates a magnetic field to write (magnetize) the magnetic domains in the data islands in one of the two magnetization directions, depending on the direction of current through the coil of the write head. Because there is no magnetic material between the data islands, the heating and write pulses must be precisely timed to efficiently magnetize the correct data islands.

FIG. 2 also shows schematically the transfer of data between a host system, such as a PC, and the disk drive. Most of the drive's electronics are contained in the system-on-a-chip (SOC). The signals from recorded data and servo sectors in the data tracks of disk 12 are detected by read head 100. The servo information is passed to servo systems in the SOC. Servo electronics generate control signals to the VCM (not shown).

This invention disclosure describes novel system architectures for TAMR where laser-pulse signals are applied to improve the TAMR process. This TAMR laser signaling architecture includes components in the R/W channel, electrical interconnect, and laser driver. This new Signal-Extraction Laser-Pulsing System Architecture will be referred to as the SELP design. This SELP design has the following characteristics:

Laser-pulsing signals generated by signal extraction using the write-data signal input to the read/write IC to regenerating the clock signal.
Phase control with respect to the write data signal.
Utilizing only existing I/Os (no additional I/Os are required).
Serial interface control for programming and/or preconditioning.
Digital control on phase and duty-cycle.
Pulsing plus dc signals for control of laser power output.
Training period during servo read for initial synchronization prior to laser pulsing.
Optional thermal sensing or power feedback for control of the laser.

The required laser pulses for TAMR are ahead of (lead) the write clock, so the invention uses the same servo information to generate the pulse train for the laser that is in sync with the write signal but is slightly leading. When the servo information is being read as the slider passes over the servo sectors, the write head is inactive and the write data lines are not being used. The invention takes advantage of this period to place additional synchronization signals on the write data lines that the SELP module uses to acquire initial lock and derive the proper timing for pulses to the laser.

Figure 7:
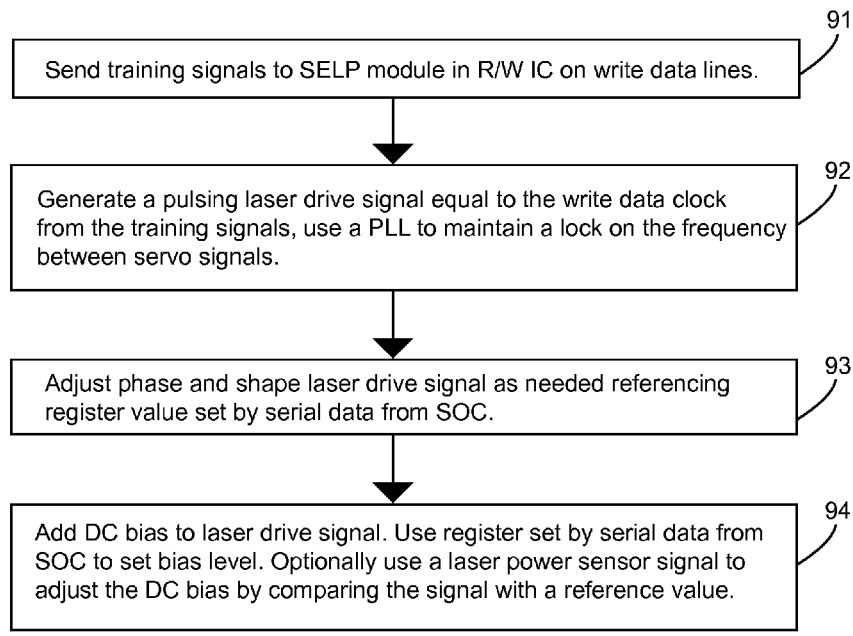
FIG. 7 illustrates a method according to an embodiment of the invention.

FIG. 7 illustrates a method according to an embodiment of the invention. The training signals are sent by the SOC to the SELP module in the R/W IC on the write data lines 91. The training signals are used to acquire initial lock for a PLL that generates a pulse train for the laser drive signal with a frequency that is equal to the write data clock 92. The PLL maintains the frequency lock between servo signals. During write cycle, the write data itself is used to maintain a lock between laser pulse clock and the incoming write data.

The phase and shape of the laser drive signal is adjusted as needed referencing the data in a register whose contents are set using serial data received from the SOC 93. DC bias is added to the signal 94. The level of DC bias is adjusted referencing register contents which are set using serial data. Optionally a laser power level sensor signal can be used as feedback to adjust the DC bias level with reference to a reference value which can be adjusted using register contents which are set using serial data.

Figure 3:
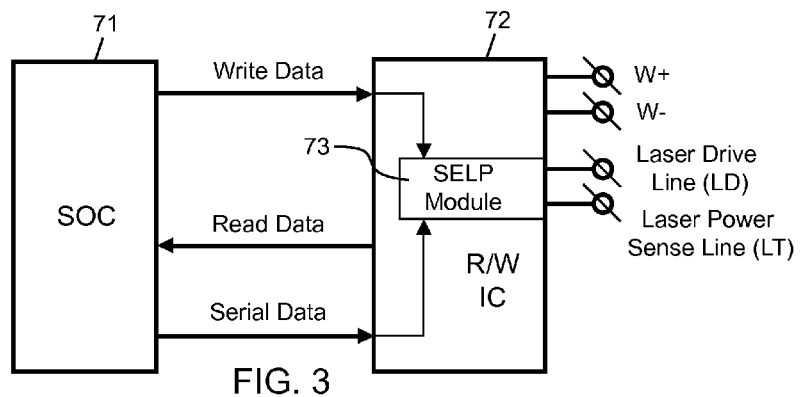
FIG. 3 illustrates the relationship between the SOC and the R/W IC that contains a SELP module according to an embodiment of the invention.

FIG. 3 shows the basic Signal-Extraction Laser-Pulsing (SELP) architecture. The two main sections are the system-on-a-chip (SOC) 71, and the Read/Write IC (R/W IC) 72 which contains SELP module 73. The pulsing signal is completely extracted from the write data and the signal pulsing source resides in the SELP module in the R/W IC. In the SOC, the general pulsing control signal settings are passed as serial data to SELP module 73, and the timing and training of the SELP signal is coordinated between the SOC and R/W IC. Existing systems have serial data inputs into the R/W IC so the invention does not require additional wires for serial data. The R/W IC laser interface output signal is driver line (LD) and an optional input signal is a laser power level sense line (LT) which is connected to a sensor in the slider.

Figure 4:
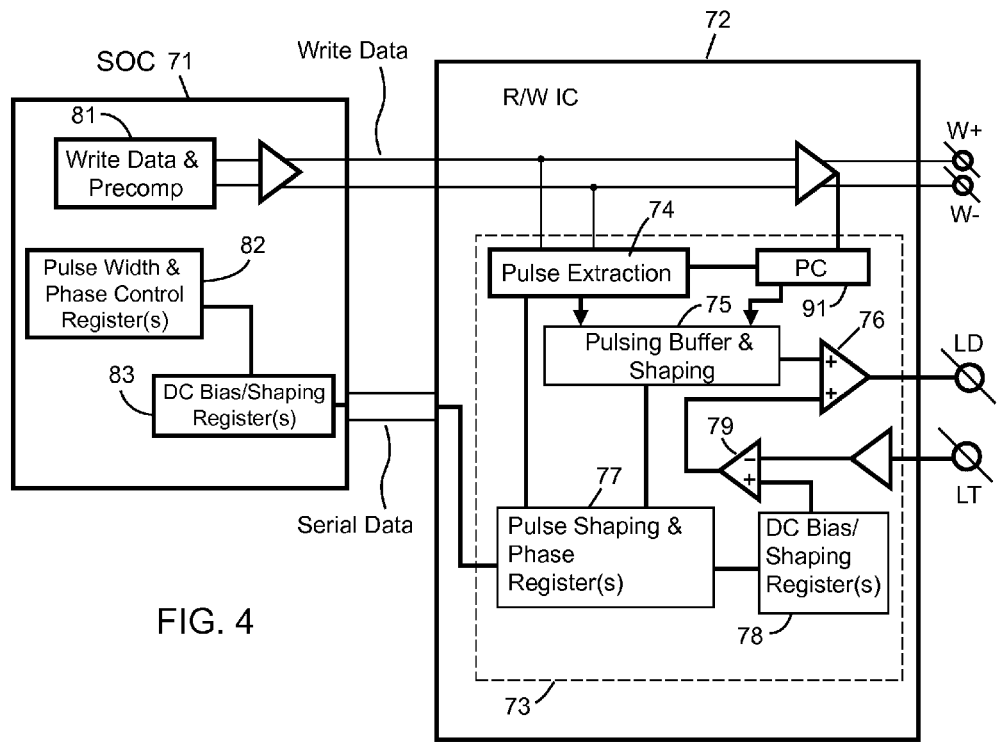
FIG. 4 illustrates selected internal components in the SOC and the R/W IC that contains a SELP module according to an embodiment of the invention.

FIG. 4 shows more details of the SELP architecture. In the SOC the pulse width and phase control register(s) 82 and DC biasing/shaping register(s) 83 hold control values that are set by the SOC. Write data and precomp block 81 provides necessary encoding of the raw data arriving from the host.

The SOC's register values, which contain the laser heating structure programming information, are transmitted through the serial data line to set the pulse shaping and phase register(s) 77 and DC bias/shaping register(s) in block 78 in the SELP module. The programmed information includes the pulse width and phase control register settings, along with controls for the low-frequency and dc biasing of the laser. With the programmed information for laser pulsing and biasing, the SELP module utilizes clock/pulse extraction circuitry 74 for deriving the clock signal from the write-data signal. This clock signal is then reshaped in block 75 which drives a positive input of amplifier 76. The other positive input of amplifier 76 comes from amplifier 79 which is a biasing signal. Thus, amplifier 76 generates the LD signal by adding the pulsed output from block 74 to the DC and low-frequency biasing signal from amplifier 79. The LD signal goes to the heating element such as a laser diode to control the pulsed heating of magnetic material on the disk.

In an embodiment that includes the optional laser power sense line (LT) as shown, the laser power/thermal feedback signal is compared by amplifier 79 to a reference voltage, which is generated by DC bias and shaping register control block 78. The output of amplifier 79 represents the difference between a reference value and the actual sensed value LT. Also, additional phase control 91 may be required to mitigate any phase shifts created by the thermal gradient in the R/W IC.

Figure 5:
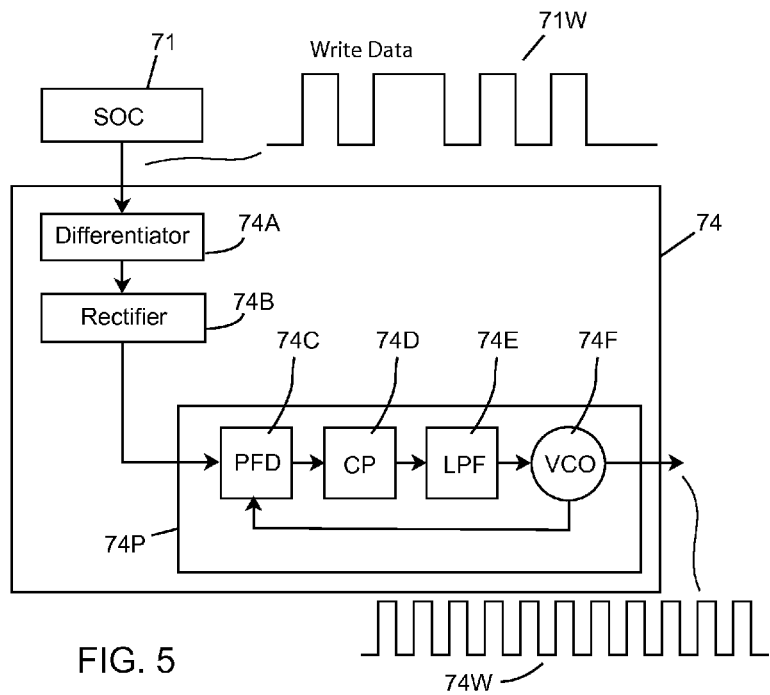
FIG. 5 illustrates selected internal components in the clock/pulse extraction unit in a SELP module according to an embodiment of the invention.

FIG. 5 illustrates more details of clock/pulse extraction block 74. For the purpose of clock extraction, a phase locked loop (PLL) 74P is employed. An advantage of the clock extraction of the invention is avoiding additional data lines in the flex cable interconnect between SOC and the write driver in the R/W IC. Incoming data 71W from the SOC 71 is in NRZ format which is passed through a differentiator 74A, a rectifier 74B and finally through a PLL 74P to generate a continuous pulsing signal 74W at the correct bit rate regardless of the incoming data pattern, because updates/compares are triggered off of the data. The PLL itself requires a phase/frequency detector (PFD) 74C, a charge pump (CP) 74D, a low pass filter (LPF) 74E and a voltage controlled oscillator (VCO) 74F. Structural internal details of these PLL building blocks are according to prior art. For the purpose of this invention, the PLL is designed to provide lock time consistent with the training pulse from the SOC. The VCO is designed to be stable during the maximum allowed number of contiguous zeros and ones, and jitter in the oscillator must meet the timing requirements imposed by thin film media heating and cooling characteristics in the particular application.

Figure 6:
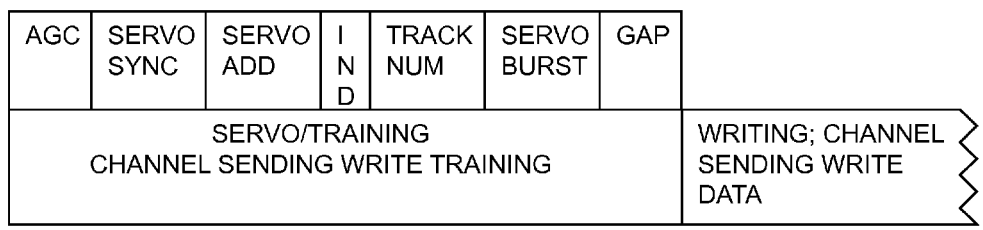
FIG. 6 illustrates the relationship between the training period and the servo fields according to an embodiment of the invention.

A problem in implementing clock extraction techniques is the signal training time required for synchronizing the extracted clock signal with the write data. The laser pulsing is required immediately when writing the data signals so no training lag time can be allowed. Therefore, a preconditioning signal training period is required prior to writing, but without any additional time added to the writing sequence, which would result in a loss in storage efficiency. In FIG. 6, the timing for the training sequence is shown in relation to the standard servo fields that can appear in each servo sector. During the time that servo information is read the main part of the write driver circuitry is off (inactive) because the drive does not write user data in the servo sectors. With this timing sequence the write data line would receive a training sequence on the write data path which is sufficient to synchronize the extracted clock signal from PLL 74P with the write data. This timing and training sequence scheme allows no loss of data storage efficiency.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A disk drive comprising:
a slider containing a read head, a write head and a laser;
a disk with thin film magnetic material that includes a plurality of angularly spaced servo sectors with servo information readable by the read head as the disk rotates and the servo sectors periodically pass under the read head;
a read-write IC that is connected through a flexible cable to a write data line as input, the read-write IC supplying a pulsing drive signal to the laser to heat magnetic material on the disk and supplying write signals to the write head, the read-write IC including a pulse extraction circuit that uses training signals on the write data line to derive a timing of the pulsing drive signal for the laser; and
system electronic circuits that periodically place the training signals on the write data line as input to read-write IC through the flexible cable when receiving servo information from the read head.

2. The disk drive of claim 1 further comprising one or more registers in the read-write IC that are set with data sent from the system electronic circuits to the read-write IC on a serial data line, the data in the registers influencing characteristics of the pulsing drive signal for the laser.

3. The disk drive of claim 2 further comprising a laser power sensor that supplies a power level signal to a first amplifier in the read-write IC which compares the power level signal to reference value, the first amplifier generating an output signal that is added to a pulse train by a second amplifier to generate the pulsing drive signal for the laser and wherein the reference value is determined using data in the registers.

4. The disk drive of claim 1 further comprising a laser power sensor that supplies a power level signal to a first amplifier in the read-write IC which compares the power level signal to a reference value, the first amplifier generating a bias output signal that is added to a pulse train by a second amplifier to generate the pulsing drive signal for the laser.

5. The disk drive of claim 1 wherein the read-write IC includes a differentiator that takes the write data line as input and supplies a signal to a rectifier, the output of the rectifier going as input to a PLL which generates a pulse train that is processed to become the pulsing drive signal for the laser.

6. The disk drive of claim 5 wherein the PLL locks to a write data clock frequency using the training signal and remains locked to the write data clock frequency between times that servo sectors periodically pass under the read head.

7. A method of operating a disk drive comprising:
periodically reading servo signals from angularly spaced servo sectors on a rotating disk with thin film magnetic material as the servo sectors pass under the read head;
periodically sending training signals to a read-write IC on write data lines while reading the servo signals; and
generating a pulsing drive signal from the training signals in the read-write IC to drive a laser to heat a spot of magnetic material on the disk before a write head applies a magnetic field to the spot of magnetic material.

8. The method of claim 7 wherein the training signals are passed through a differentiator and a rectifier before being fed into a PLL in the read-write IC, and the output from the PLL locking to a frequency that is equal to a frequency of a write data clock and remaining locked to a frequency of a write data clock between servo signals.

9. The method of claim 7 further comprising setting one or more registers in the read-write IC using data received by the read-write IC on a serial data line, and using the data in the registers to set characteristics of the pulsing drive signal for the laser.

10. The method of claim 7 further comprising comparing a power level signal from laser power sensor to reference value, and using a difference between the power signal and the reference value to adjust a DC bias that is included in the pulsing drive signal for the laser.

11. The method of claim 10 wherein the reference value is determined using data in a register that is set using data received by the read-write IC on a serial data line.

12. A disk drive comprising:
a disk with thin film magnetic material organized in concentric tracks and including a plurality of angularly spaced servo sectors with servo information readable by a read head as the disk rotates and the servo sectors periodically pass under the read head;
a slider containing the read head, a write head, a laser, and a laser power level sensor, the slider being selectively positionable over each track;
a read-write IC that is connected through a flexible cable to a write data line as input, the read-write IC supplying a pulsing drive signal to the laser to heat magnetic material on the disk and supplying write signals to the write head, the read-write IC including a pulse extraction circuit that uses training signals on the write data lines to derive a timing of the pulsing drive signal for the laser, the read-write IC including a first amplifier that compares a signal from the laser power level sensor to a reference value to generate a DC bias output signal that is added to the pulsing drive signal for the laser; and system electronic circuits that periodically place the training signals on the write data line as input to read-write IC when the servo sectors pass under the read head.

13. The disk drive of claim 12 further comprising one or more registers in the read-write IC that are set with data sent from the system electronic circuits to the read-write IC on a serial data line, the data in the registers influencing characteristics of the pulsing drive signal for the laser.

14. The disk drive of claim 13 wherein the reference value is determined using data in the registers.

15. The disk drive of claim 12 wherein the read-write IC includes a differentiator that takes the write data line as input and supplies a signal to a rectifier, the output of the rectifier providing input to a PLL which generates a pulse train that is processed to become the pulsing drive signal for the laser.

16. The disk drive of claim 15 wherein the PLL locks to a write data clock frequency using the training signal and remains locked to the write data clock frequency between times that servo sectors periodically pass under the read head.

* * * * *